United States Patent [19]
Yamamoto

[11] Patent Number: 6,124,999
[45] Date of Patent: *Sep. 26, 2000

[54] APPARATUS FOR RECORDING/REPRODUCING DIGITAL INFORMATION TO/FROM A MEMORY DEVICE

[75] Inventor: Yukinori Yamamoto, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/847,245

[22] Filed: May 1, 1997

Related U.S. Application Data

[63] Continuation of application No. 08/423,696, Apr. 18, 1995, abandoned.

[30] Foreign Application Priority Data

Apr. 21, 1994 [JP] Japan ...................................... 6-083012

[51] Int. Cl.[7] ........................... G11B 15/18; G11B 27/00; G11B 23/02; H04N 9/79
[52] U.S. Cl. ............................. 360/69; 360/13; 360/132; 386/40; 386/52
[58] Field of Search ............................... 360/69, 71, 132, 360/13; 386/35, 40, 52, 124

[56] References Cited

U.S. PATENT DOCUMENTS

| | | | |
|---|---|---|---|
| 4,338,644 | 7/1982 | Staar | 360/132 |
| 4,426,684 | 1/1984 | Sechet et al. | 364/900 |
| 4,814,924 | 3/1989 | Ozeki | 369/291 |
| 5,023,741 | 6/1991 | Conti et al. | 360/66 |
| 5,132,947 | 7/1992 | Kameda et al. | 369/32 |
| 5,341,250 | 8/1994 | Uchida et al. | 360/48 |
| 5,428,406 | 6/1995 | Terasawa | 348/734 |
| 5,434,721 | 7/1995 | Sawada et al. | 360/69 |
| 5,625,517 | 4/1997 | Sawada et al. | 360/69 |

FOREIGN PATENT DOCUMENTS 580434 1/1994 European Pat. Off. .

*Primary Examiner*—Paul Loomis
*Assistant Examiner*—Regina Y. Neal
*Attorney, Agent, or Firm*—Fitzpatrick, Cella, Harper & Scinto

[57] ABSTRACT

Apparatus for recording/reproducing digital information to/from a memory device is for use with a memory device which has plural memories at least one of which stores digital information corresponding to information stored in at least one other of the plural memories. The apparatus include reproducing structure for reproducing digital information from only the part of the memory device which stores the digital information. The apparatus also includes processing circuitry for performing predetermined signal processing on the digital information reproduced by the reproducing structure. Preferably, the memory is a magnetic tape cassette having a magnetic memory and a semiconductor memory. Preferably, the reproducing apparatus is a wireless remote control capable of contacting the tape cassette semiconductor memory to read the digital information stored therein. In this way, digital information regarding the data stored on the magnetic tape may be reproduced or recorded without having to insert the magnetic cassette into the VCR.

25 Claims, 5 Drawing Sheets

APPARATUS FOR RECORDING/ REPRODUCING DIGITAL INFORMATION TO/FROM A MEMORY DEVICE

This application is a continuation of application Ser. No. 08/423,696 filed Apr. 18, 1995, now abandoned.

BACKGROUND OF THE INVENTION

1. Field of the Invention

The present invention relates to an apparatus for recording/reproducing digital information to/from a memory device, and more particularly, to an apparatus for recording/reproducing both data signals and digital information related to the data signals to/from a memory device such as a magnetic tape cassette.

2. Description of the Related Art

As one such apparatus, a digital VTR (which converts motion picture signals, such as video signals, into digital form and records the digital signals on a magnetic tape) is well known. Furthermore, there has been devised a magnetic tape cassette device having a memory, such as a semiconductor memory (referred to as "a memory" hereinafter), in addition to the magnetic tape. Information to be stored in such a semiconductor memory includes the thickness and type of the tape, the title of a recorded picture, and the like.

However, if a user seeks from a large group of recorded cassette tapes a cassette tape on which a desired program is recorded, since a plurality of programs may be recorded on each of the cassette tapes, such user is required to sequentially load into the VTR the cassette tapes which are thought to possibly include the desired program and to look at each program recorded therein. This operation causes the user much trouble.

In addition, each time the title of a cassette tape is recorded or changed, it is necessary to load a cassette, having the tape therein, into the main body of the VTR.

When the number of cassettes is large, there is a fear that the user will, by mistake, erase a recorded program which has not yet been seen.

SUMMARY OF THE INVENTION

An object of the present invention is to overcome the above-mentioned problems.

Another object of the present invention is to provide an apparatus capable of easily reproducing digital information signals, such as video signals, from a desired memory among a plurality of memories.

According to one aspect of the present invention, there is provided a reproducing apparatus for use with a memory device which has plural memories at least one of which stores digital information corresponding to information stored in at least one other of the plural memories; the apparatus comprising reproducing means for reproducing digital information from only the part of the memory device which stores the digital information, and processing means for performing predetermined signal processing on the digital information reproduced by the reproducing means.

According to another aspect of the present invention, a reproducing system comprises (a) a memory device integrally having plural memories of different types, at least one of said plural memories storing digital information corresponding to information stored in at least one other of the plural memories. The system also includes (b) a reproducing device which has reproducing means for reproducing the digital information from only the part of said memory device which stores the digital information, and processing means for performing predetermined signal processing on the digital information reproduced by said reproducing means.

According to a further aspect of the present invention, an information signal processing system includes (a) a memory device integrally having plural memories of different types, at least one of said memories storing digital information corresponding to information stored in at least one other of the plural memories. The system also includes (b) a reproducing device having first reproducing means for reproducing the digital information from only the part of said memory device which stores the digital information. The reproducing device also has processing means for performing predetermined signal processing on the digital information reproduced by said first reproducing means, and transmitting means for transmitting, as a wireless signal, the digital information processed by said processing means. The system also includes (c) a signal processing device having second reproducing means for reproducing information from each of said plural memories in said device. The signal processing device also has input means for inputting the wireless digital information signal transmitted by said transmitting means, an output means for outputting (i) the information reproduced by said reproducing means and (ii) the digital information signal received by said input means. The system also includes (d) a display device for providing a display corresponding to the digital information signal output from the output means.

According to yet a further aspect of the present invention, a reproducing apparatus for use with an external reproducing device and an external memory device having a plurality of memories storing different types of information, includes control means for wireless controlling of the operation of the external device, and reproducing means for reproducing the digital information signal from one of the plural memories of the memory device.

These and other objects, features and advantages of the present invention will become more apparent from the following detailed description of the preferred embodiment taken in conjunction with the accompanying drawings.

DETAILED DESCRIPTION OF THE PREFERRED EMBODIMENT

A preferred embodiment of the present invention will now be described with reference to the accompanying drawings.

First, recording and reproduction on a cassette having a tape and an integral semiconductor memory therein will be described with reference to FIG. 1.

Figure 1:
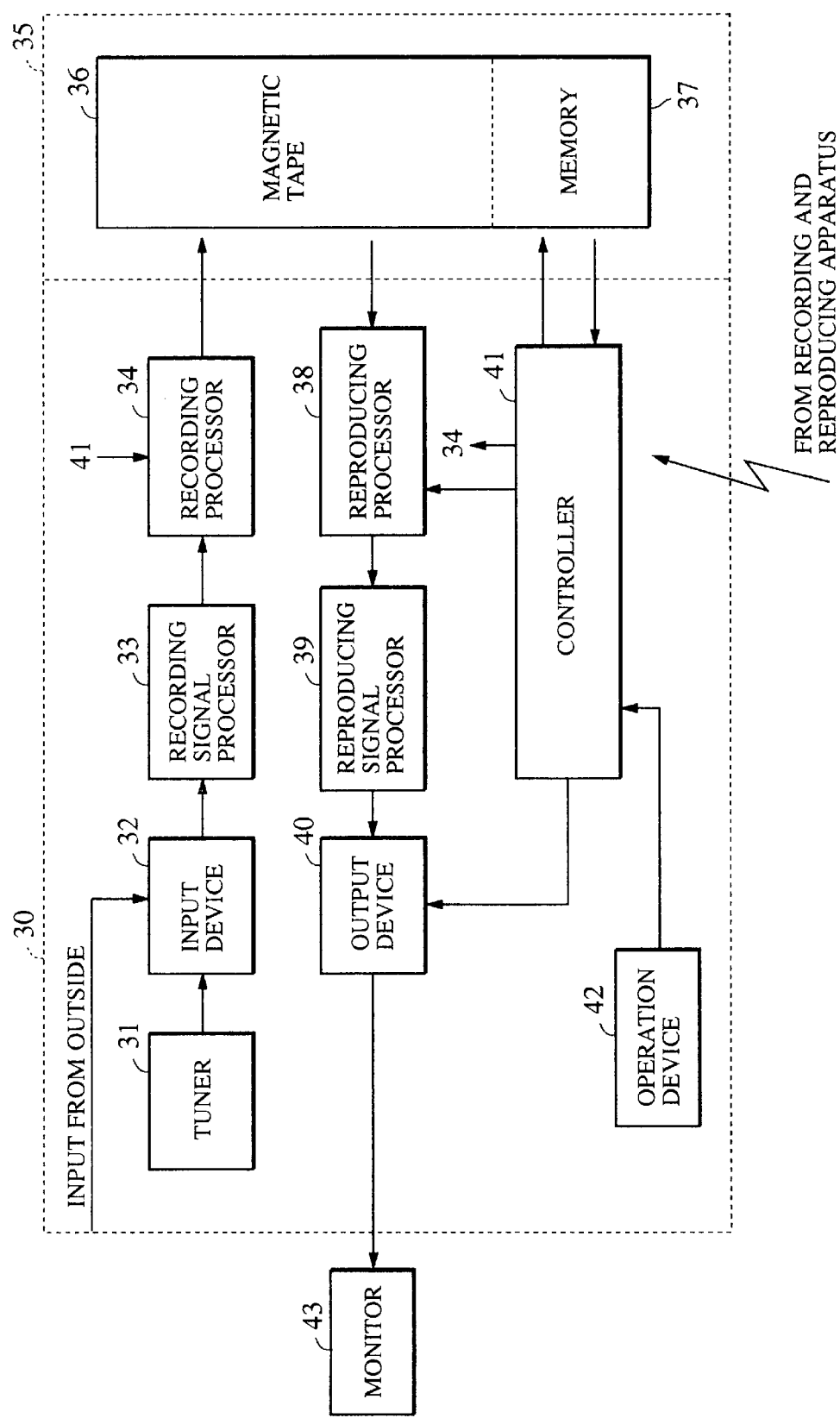
FIG. 1 is a block diagram showing a construction of a digital VTR for performing recording and reproduction on a cassette according to an embodiment of the present invention.

FIG. 1 is a block diagram showing the construction of a digital VTR for performing recording and reproduction of such a cassette.

In recording, video or audio signals selected in a tuner 31 or input from outside are output to a recording signal processor 33 through an input device 32. The recording signal processor 33 converts the input signals into digital form. The amount of information contained in the video signals is compressed in the processor 33 by using well-known techniques, such as DCT (Discrete Cosine Transformation), quantization or variable-length coding, and the amount of information contained in audio signals is compressed by being converted into PCM signals. After error-correcting coding, the digital signals are output to a recording processor 34. The recording processor 34 converts these signals into a form suitable for magnetic recording by digital modulation or the like, and outputs the converted signals to an unillustrated magnetic head, by which the output signals are recorded on a magnetic tape 36 in a cassette 35.

At this time, digital information signals (to be described later) concerning the signals to be recorded on the magnetic tape 36 are produced in a controller 41, and recorded in a memory 37, for example, a semiconductor memory.

In reproduction, the digital video or audio signals are reproduced from the magnetic tape 36 by a magnetic head (not shown), converted by a reproducing processor 38 into a form suitable for later signal processing by demodulation or the like corresponding to the modulation performed in the recording process, and output to a reproducing signal processor 39. The reproducing signal processor 39 corrects code errors of the reproduced signals, expands the compressed amount of information by a process reverse to that used for recording, and outputs the signals to an external monitor 43 or the like through an output device 40.

At this time, the digital information signals recorded in the memory 37 are also reproduced, subjected to predetermined processing by the controller 41, and output to the outside through the output device 40 as signals in a form which allows the contents thereof to be confirmed.

Furthermore, the controller 41 controls the whole VTR (recording and reproduction), receives signals from a remote control (not shown), and manages and carries out recording of programs preselected in advance.

As described above, the controller 41 produces and records predetermined information signals in the memory 37 automatically, or upon receipt of the user's directions from an operation device 42 or a recording and reproducing apparatus 10 to be described later. Information to be recorded in the memory 37 simultaneously with recording of the tape 36 includes, for example, recording time, positional information on the tape 36 (time code), date, and an index image indicating the contents of each program, as well as information recorded according to directions of the user, including for example, the name and genre of each program, keywords and comments.

When the cassette 35 (in which such information is already recorded in the memory 37) is loaded into the VTR, the information can be reproduced by the controller 41 in the manner mentioned above.

Figure 2:
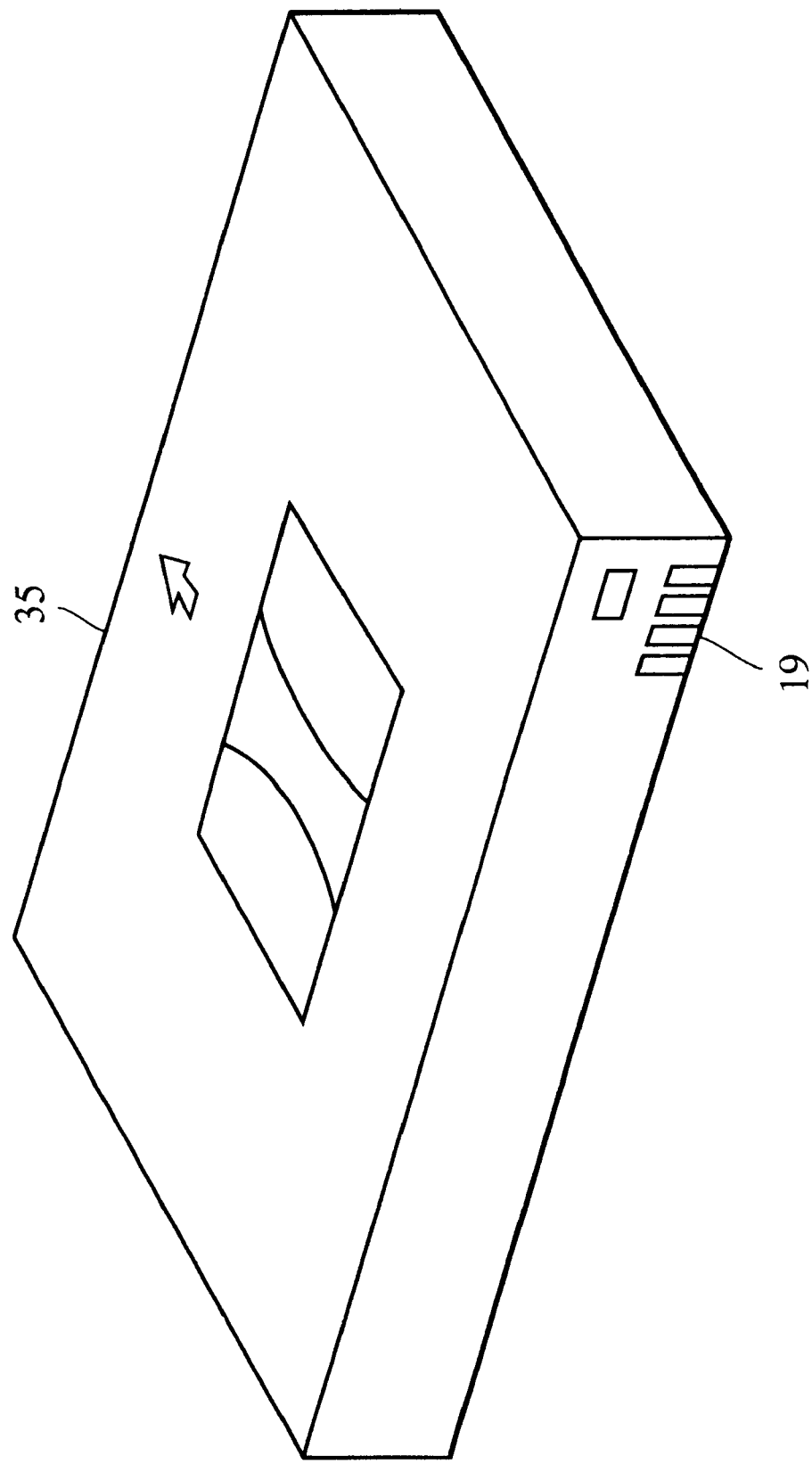
FIG. 2 is a view showing an outward appearance of a cassette used in the embodiment of the present invention.

FIG. 2 illustrates an outward appearance of the cassette 35. Numeral 19 denotes an input/output terminal to allow the memory 37 to be accessed therethrough.

A recording and reproducing apparatus in this embodiment of the present invention will now be described with reference to FIG. 3.

Figure 3:
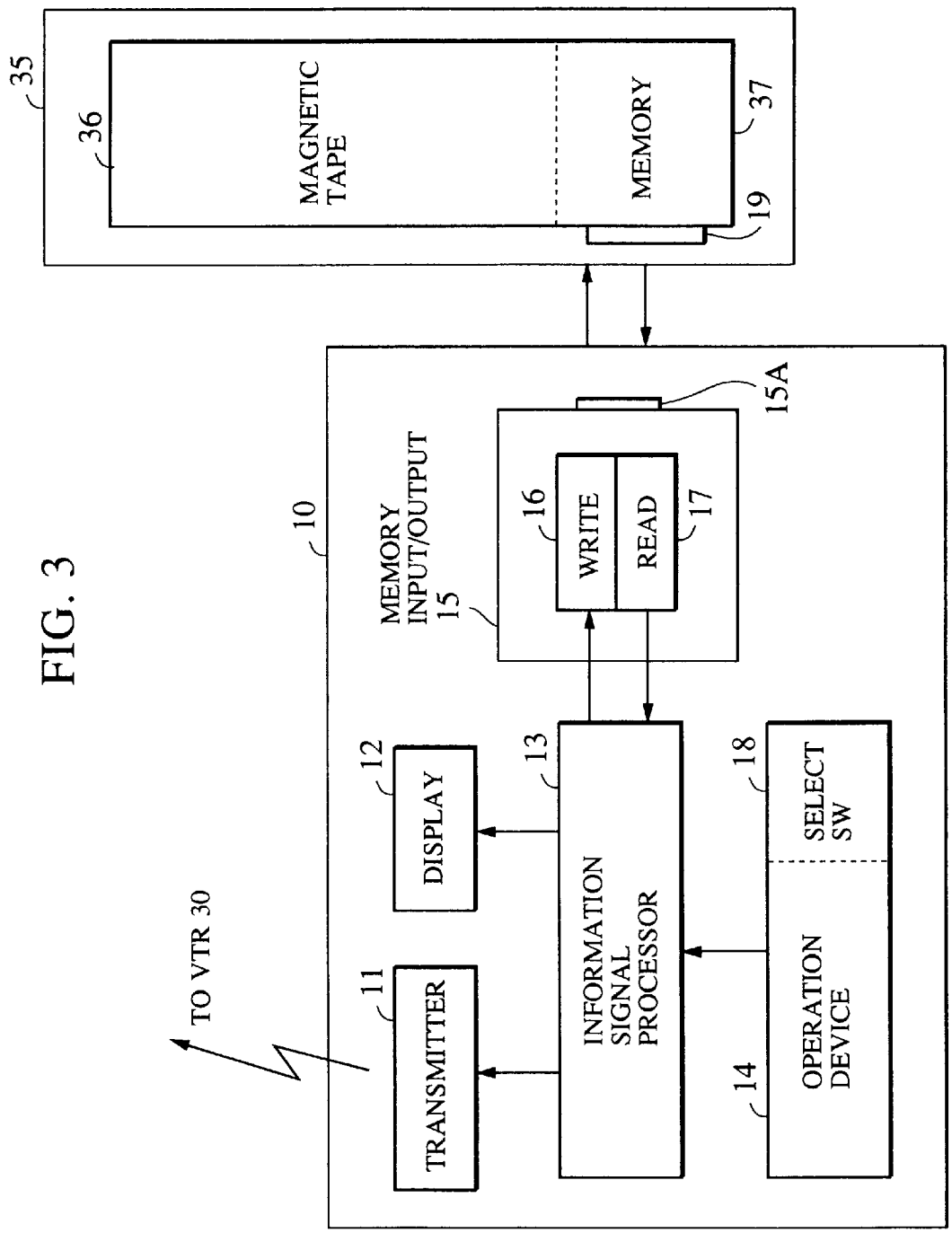
FIG. 3 is a block diagram showing a construction of a recording and reproducing apparatus according to the embodiment of the present invention.

FIG. 3 is a block diagram showing the construction of a recording and reproducing apparatus 10, which may be, for example, a remote control device. Referring to FIG. 3, the recording and reproducing apparatus 10 comprises a transmitter 11, a display 12, an information signal processor 13 (referred to as "a CPU" hereinafter), an operation device 14, a memory input/output device 15, a memory write unit 16, a memory read unit 17, and a mode select switch 18. Numeral 35 denotes a memory-contained cassette tape.

The recording and reproducing apparatus 10 shown in FIG. 3 also has a well-known function as a remote control unit.

Specifically, the operation device 14 is provided with various control buttons for controlling the operation of the VTR 30 (for example, play, fast forward, reverse and record buttons), and a control signal corresponding to the operation of these buttons is transmitted to the VTR 30 through the information signal processor 13 and the transmitter 11. At this time, the control signal is transmitted in wireless form, such as infrared radiation, from the transmitter 11 to the VTR 30.

Accordingly, the user can control the operation of the VTR 30 at a distance from the VTR 30 by manipulation of the operation device 14.

Recording and reproduction of digital information signals in and from the memory 37 by this recording and reproducing apparatus 10 will now be described.

In order to read the signals from the memory 37, the recording and reproducing apparatus 10 is first placed in a memory read mode by the mode select switch 18 in the operation device 14, and a terminal 15A of the memory input/output device 15 is brought into contact with a memory input/output terminal 19 of the cassette 35. The memory input/output device 15 has the input/output terminal 15a corresponding to the input/output terminal 19 on the side of the cassette 35, whereby the CPU 13 is made capable of accessing the memory 37. Accordingly, the memory 37 of the cassette 35 can be accessed without loading it into the VTR 30.

Figure 4:
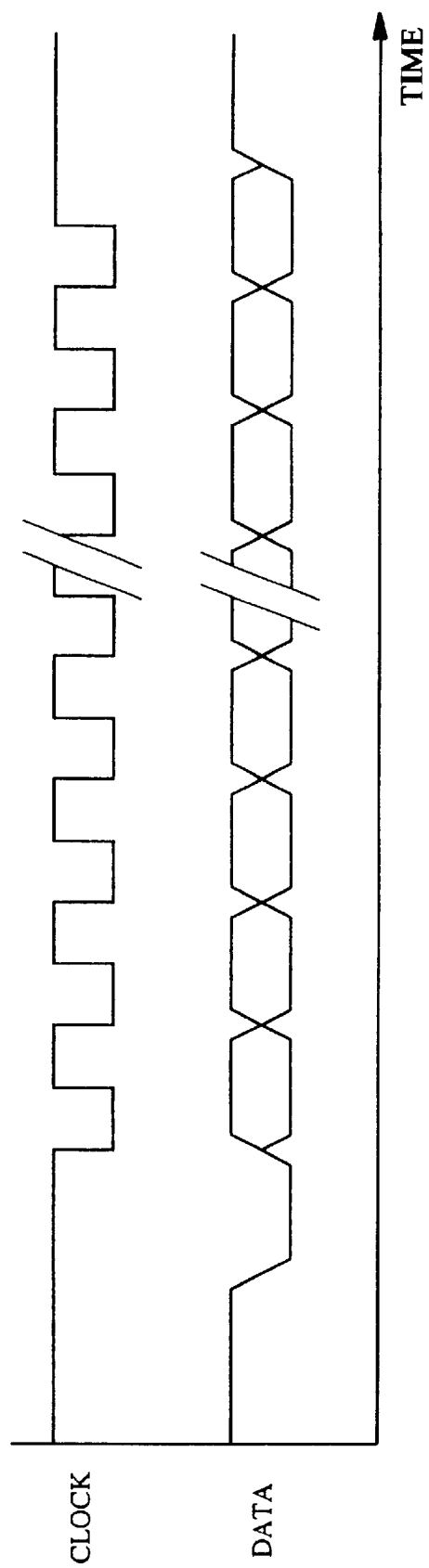
FIG. 4 is a view showing a state of data transfer between a memory and a main body of the apparatus.

FIG. 4 shows sample input and output signals transferred between the input/output device 15 and the memory 37. Only two signal lines of a clock signal and a data signal are used. The address of the memory, data, and the read/write mode are transmitted as one bit of serial data in synchronization with the clock signal.

Figure 5:
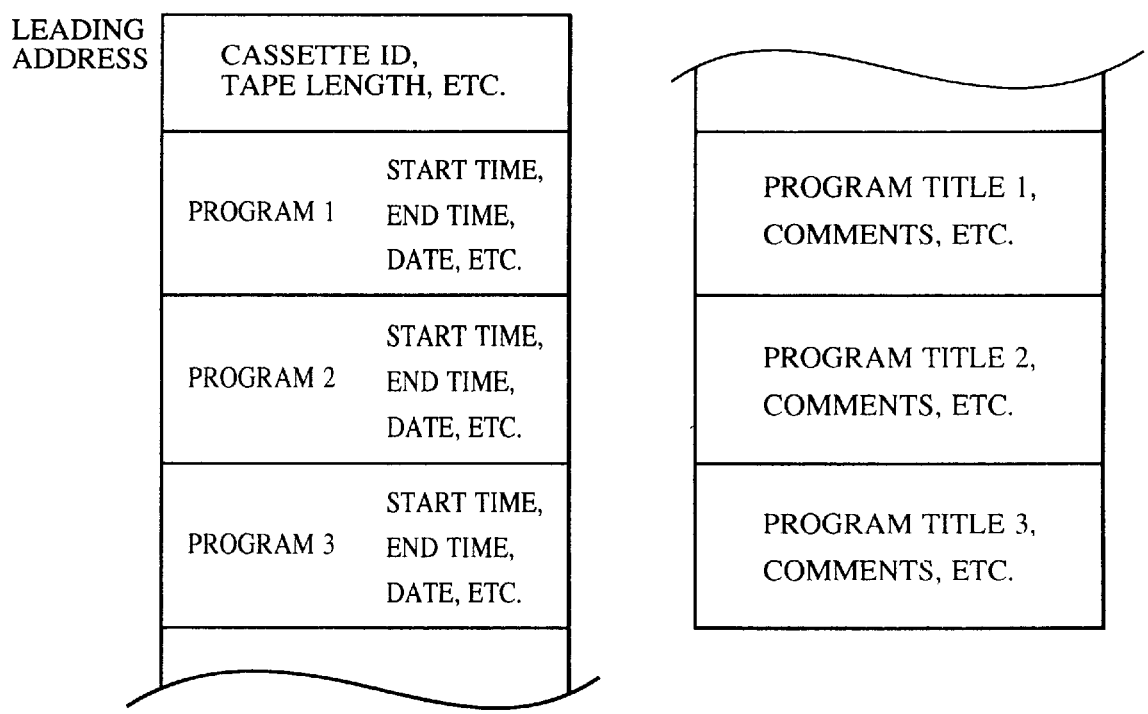
FIG. 5 is a view showing the contents recorded in the memory of the embodiment of the present invention.

FIG. 5 shows an example of the contents of information written in the memory 37. In this example, the ID of a cassette, tape length and the like are written at the head of the memory 37, and subsequently, the start position (time), end position (time), and date of each recorded program on the tape 36, and the title of the program as text information are also written.

Such information is read into the CPU 13 through the memory input/output device 15, converted into image (character) data representing the contents of the information through predetermined processing by the CPU 13, and displayed on the display 12. The user can thereby easily know what program is recorded in the cassette 35 by only a simple operation to bring the input/output device 15 of the recording and reproducing apparatus 10 in contact with the terminal 19 of the cassette 35.

Detailed information, which cannot be displayed on the display 12, is transferred to the VTR 30 through the transmitter 11 by pressing a transmit button (not shown) in the operation device 14, and such information is displayed on a screen of the monitor 43. However, in this case, it is required that the VTR power be on and that the monitor 43 be ready to display a picture output from the VTR 30 thereon.

Recording of digital information signals in the memory 37 will now be described. In normal cases, since the recording start and end positions (time or a time code), and the date of each program, the index image and the like are automatically recorded by the VTR 30 during recording, the title (volume name) given to the cassette, the program title and the like are considered to be written as such digital information.

First, after the contents of the memory 37 are read into the recording and reproducing apparatus 10 according to the above-mentioned procedure, editing (addition, deletion, changes and the like) of information is performed through key entry in the operation device 14 while watching the information displayed on the display 12. After editing, when a memory write mode is selected by the mode select switch 18 and the memory input/output device 15 is brought into contact with the memory input/output terminal 19 of the cassette 35, the CPU 13 writes this information into the memory 37 of the cassette 35 as digital signals through the memory write unit 16. At the completion of writing, the contents of the memory 37 are read again to verify whether the information is written correctly, the verification result is displayed on the display 12, and then, the writing process is terminated. At this time, editing can be performed on the screen of the monitor 43 by transferring the information from the transmitter 11 to the VTR 30 in the same manner as in reading from the memory 37. It is unnecessary to keep the recording and reproducing apparatus 10 in contact with the cassette 35 throughout the editing process. As for another application of the memory write function, which relates to the function of the VTR 30, it is possible to prevent a program from being recorded over another important program by previously designating such a fact during recording of the important program which is not to be erased, and recording the designation information indicating that fact in the memory 37.

The mode select switch 18 may automatically select the memory read mode when the recording and reproducing apparatus 10 is brought into contact with the cassette 35.

The construction of the recording and reproducing apparatus 10 shown in FIG. 3 is almost the same as that of a typical remote control for a VTR, and only a mode select device and a memory read/write device are added thereto. As other embodiments, it is possible to provide a similar function to a tape rewinder, not shown, or to add a memory input/output function of a cassette to an electronic notebook, even though it is not directly related to the VTR.

Although recording and reproduction are performed on the cassette 35 integrally having the magnetic tape 36 and the memory 37 in the above-mentioned embodiment, the present invention is not limited to such an embodiment, but the cassette 35 may be integrally provided with a plurality of types of memories. In this case, a plurality of input/output devices corresponding to the memories are mounted in the apparatus body.

As described above, in a memory device of this embodiment which is integrally provided with different types of plural memories, information signals can be recorded on and reproduced from only some of the memories, the contents recorded in the memory device can be confirmed without carrying out reproduction on all of the memories, and the contents of some of the memories can be rewritten without carrying out recording on all the memories.

Therefore, it is possible to ease the inconvenience resulting from the confirmation of the contents recorded in the memory device and the like, and to achieve an effective use of the memories.

The present invention has been described with respect to the preferred embodiment in which the memory device comprises a video cassette storing a magnetic tape. However, the invention is also applicable to other memory devices storing other types of information such as a magnetic tape cassettes storing audio information, a compact disk device storing video and/or audio information, a magneto-optical device storing video and/or audio information, a detachable semiconductor memory storing video and/or audio information, etc.

The individual component shown in outline or designated by blocks in the attached Drawings are all well-known in the recording arts, and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording and reproducing apparatus for use with a memory device which has different types of memories, the different types of memories including a first memory having a predetermined memory capacity and a second memory having a smaller memory capacity than the first memory, said apparatus comprising:

an apparatus body;

reproducing means for reproducing a digital information signal from the second memory;

display means for displaying the digital information signal reproduced by said reproducing means;

modification means for modifying pre-existing contents of the digital information signal reproduced by said reproducing means, and for obtaining a modified digital information signal, said modification means eliminating the digital information signal to modify the pre-existing contents of the digital information signal;

recording means for recording the modified digital information signal obtained by said modification means to said second memory; and mode setting means for setting a mode of said apparatus between a first mode in which said reproducing means reproduces the digital information signal from the second memory and said display means displays the reproduced digital information signal, and a second mode in which said modification means modifies the reproduced digital information signal and said recording means records the modified digital information signal, wherein said reproducing means, said display means, said modification means, said recording means, and said mode setting means are arranged in the apparatus body, and wherein said recording and reproducing apparatus can reproduce the digital information signal only from said second memory, and can record the modified digital information signal only to said second memory.

2. An apparatus according to claim 1, wherein said reproducing means reproduces a digital image signal from said second memory.

3. An apparatus according to claim 1, wherein said reproducing means reproduces from said second memory a digital information signal which is related to a digital image signal stored in the first memory.

4. An apparatus according to claim 1, wherein said memory device comprises a tape cassette, wherein said second memory comprises a semiconductor memory, and wherein said first memory comprises a magnetic tape.

5. An apparatus according to claim 1, further comprising the memory device.

6. Apparatus according to claim 1, further comprising:
an instruction member for manually instructing a modification operation of said modification means, wherein said modification means modifies the digital information signal according to an instruction of said instruction member.

7. A recording and reproducing system, comprising:
(a) a memory device integrally having different types of memories, the different types of memories including a first memory having a predetermined memory capacity and a second memory having a smaller memory capacity than the first memory; and
(b) a recording and reproducing device, said recording and reproducing device including:
an apparatus body;
reproducing means capable of reproducing a digital information signal from said second memory;
display means for displaying information corresponding to the digital information signal reproduced by said reproducing means,
modification means for modifying pre-existing contents of the digital information signal reproduced by said reproducing means, and for obtaining a modified digital information signal, said modification means eliminating the digital information signal to modify the pre-existing contents of the digital information signal;
recording means for recording the modified digital information signal obtained by said modification means to said second memory; and
mode setting means for setting a mode of said apparatus between a first mode in which said reproducing means reproduces the digital information signal from the second memory and said display means displays the reproduced digital information signal, and a second mode in which said modification means modifies the reproduced digital information signal and said recording means records the modified digital information signal,
wherein said reproducing means, said display means, said modification means, said recording means, and said mode setting means are arranged in the apparatus body, and
wherein said recording and reproducing device can reproduce the digital information signal only from said second memory, and can record the modified digital information signal only to said second memory.

8. A system according to claim 7, wherein said different memories of said memory device each store a digital image signal.

9. A system according to claim 7, wherein said reproducing means reproduces from said second memory a digital information signal which is related to a digital image signal stored in the first memory.

10. A system according to claim 7, wherein said memory device comprises a tape cassette, wherein said second memory comprises a semiconductor memory, and wherein said first memory tape.

11. A system according to claim 7, wherein said reproducing device further comprises:
transmitting means for transmitting to outside said apparatus, as a wireless signal, the digital information processed by said processing means.

12. A system according to claim 7, further comprising a signal processing device including second reproducing means for reproducing digital information from said first memory.

13. A system according to claim 12, wherein said signal processing device includes:
generating means for generating the digital information; and
second recording means for recording the digital information generated by said generating means into of said first memory.

14. A system according to claim 13, further comprising:
image generating means for generating a digital image signal; and
information generating means for generating a digital information signal corresponding to the digital image signal generated by said image generating means, and wherein said second recording means records the digital information signal from said information generating means into said second memory, and records the digital image signal from said image generating means into the first memory.

15. A system according to claim 14, wherein said image generating means includes means for compressing an amount of information contained in an input digital image signal.

16. A system according to claim 14, wherein said information generating means generates a digital image signal representing the content of a digital image signal to be recorded in said first memory as the digital information signal.

17. Apparatus according to claim 7, further comprising:
an instruction member for manually instructing a modification operation of said modification means, wherein said modification means modifies the digital information signal according to an instruction of said instruction member.

18. A recording and reproducing apparatus for use with (i) an external memory device having different types of memories including a first memory storing a digital image signal and a second memory storing a digital information signal relating to the digital image signal, and (ii) a recording and reproducing device for recording and reproducing the digital image signal and the digital information signal on and from the external memory device, said apparatus comprising:
an apparatus body;
an instruction member for manually instructing recording operations and reproducing operations of said recording and reproducing device;
control means for wireless controlling of the recording and reproducing operations of said recording and reproducing device according to the instruction of the instruction member;
reproducing means for reproducing a digital information signal from said second memory;
modification means for modifying pre-existing contents of the digital information signal reproduced by said reproducing means, and for obtaining a modified digital information signal, said modification means eliminating the digital information signal to modify the pre-existing contents of the digital information signal;

recording means for recording the modified digital information signal obtained by said modification means to said second memory; and mode setting means for setting a mode of said apparatus between a first mode in which said reproducing means reproduces the digital information signal from the second memory and said display means displays the reproduced digital information signal, and a second mode in which said modification means modifies the reproduced digital information signal and said recording means records the modified digital information signal, wherein said instruction member, said control means, said reproducing means, said modification means, said recording means, and said modification means are arranged in the apparatus body, and wherein said recording and reproducing apparatus can reproduce the digital information signal only from said second memory, and can record the modified digital information signal only to said second memory.

19. An apparatus according to claim 18, wherein said plural memories in said memory device each store a digital image signal.

20. An apparatus according to claim 19, wherein said apparatus comprises a digital VCR, and wherein said first comprises a magnetic tape cassette.

21. An apparatus according to claim 18, further comprising display means for displaying information corresponding to the digital information signal reproduced by said reproducing means, and information corresponding to the modified digital information.

22. A recording and reproducing apparatus for use with a memory device which has different types of memories, the different types of memories including a first memory storing a digital image signal and a second memory storing a digital subordinate signal related to the first memory, said apparatus comprising:

reproducing means for reproducing the digital subordinate signal from the second memory;

modification means for modifying pre-existing contents of the digital subordinate signal reproduced by said reproducing means, and for obtaining a modified digital subordinate signal, said modification means eliminating the digital subordinate signal to modify the pre-existing contents of the digital subordinate signal;

recording means for recording the modified digital subordinate signal obtained by said modification means to the second memory;

an instruction member for manually instructing a mode of said apparatus; and mode setting means for setting the mode of said apparatus between a plurality of modes according to the instruction of said instruction member, wherein the plurality of modes include a reproducing mode in which said reproducing means reproduces the digital subordinate signal from the second memory, and a recording mode in which said modification means modifies the reproduced digital subordinate signal and said recording means records the modified digital subordinate signal to the second memory, wherein said reproducing means, said modification means, said recording means, said instruction member, and said mode setting means are within the apparatus body, and wherein said recording and reproducing apparatus can reproduce the digital information signal only from the second memory and can record the modified digital subordinate signal only to the second memory.

23. Apparatus according to claim 22, wherein the second memory has a smaller memory capacity than the first memory.

24. Apparatus according to claim 22, wherein said memory device comprises a tape cassette, wherein the second memory comprises a semiconductor memory, and wherein the first memory comprises a magnetic tape.

25. Apparatus according to claim 22, further comprising:

display means for displaying information corresponding to the digital subordinate signal processed by said reproducing means; and transmitting means for transmitting to outside said apparatus, as a wireless signal, the digital subordinate signal reproduced by said reproducing means.

* * * * *

UNITED STATES PATENT AND TRADEMARK OFFICE
CERTIFICATE OF CORRECTION

PATENT NO. : 6,124,999
DATED : September 26, 2000
INVENTOR(S) : Yukinori Yamamoto It is certified that error appears in the above-identified patent and that said Letters Patent is hereby corrected as shown below:

Title page,
Item [57] ABSTRACT,
Line 1, "Apparatus" should read -- An apparatus --; and
Line 6, "include" should read -- includes --.

Column 6,
Line 4, "cassettes" should read -- cassette --.

Column 7,
Line 9, "Apparatus" should read -- An apparatus --;
Line 67, "said first memory tape" should read -- said first memory comprises a magnetic tape --.

Column 8,
Line 15, "into of" should read -- into --; and
Line 37, "Apparatus" should read -- A system --.

Column 9,
Line 24, "claim 19," should read -- claim 18, --; and
Line 25, "first" should read -- first memory --.

Column 10,
Lines 27, 30 and 34, "Apparatus" should read -- An apparatus --.

Signed and Sealed this

Eighteenth Day of December, 2001

*Attest:*

*Attesting Officer*

JAMES E. ROGAN
*Director of the United States Patent and Trademark Office*